June 30, 1936.  E. W. SCHELLENTRAGER  2,046,040
ASSOCIATED GATES FOR HOPPERS
Filed Aug. 10, 1931  2 Sheets-Sheet 1
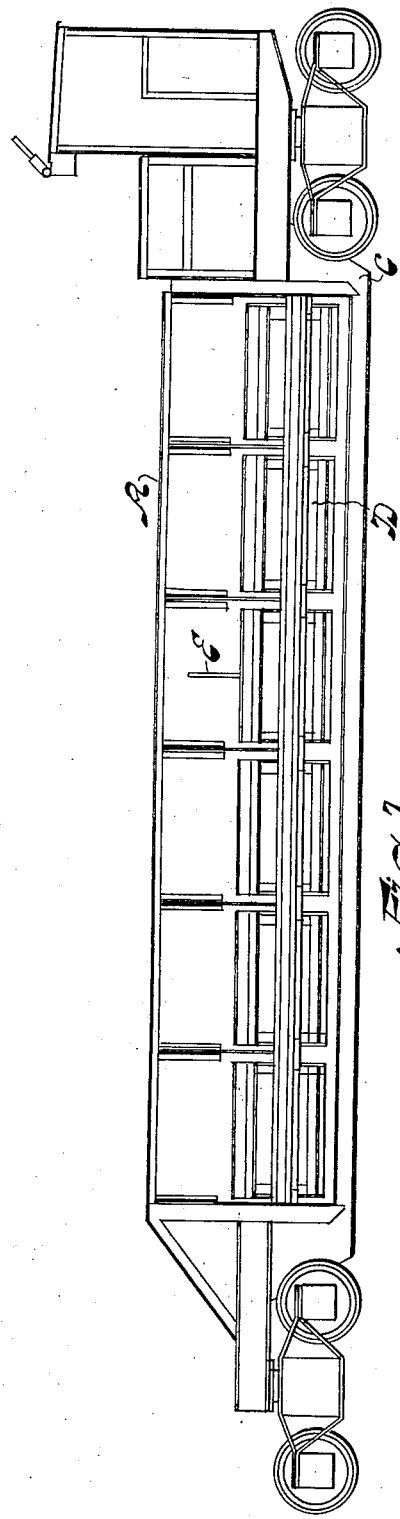
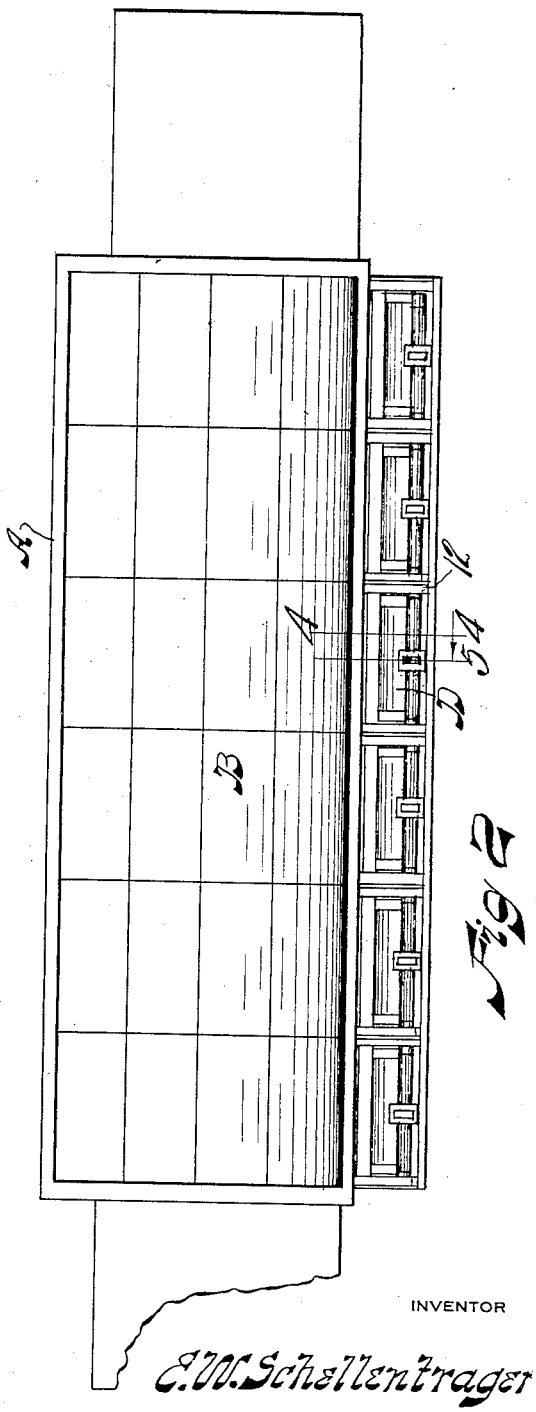
INVENTOR
E.W.Schellentrager
By C.F.Heinkel,
ATTORNEY

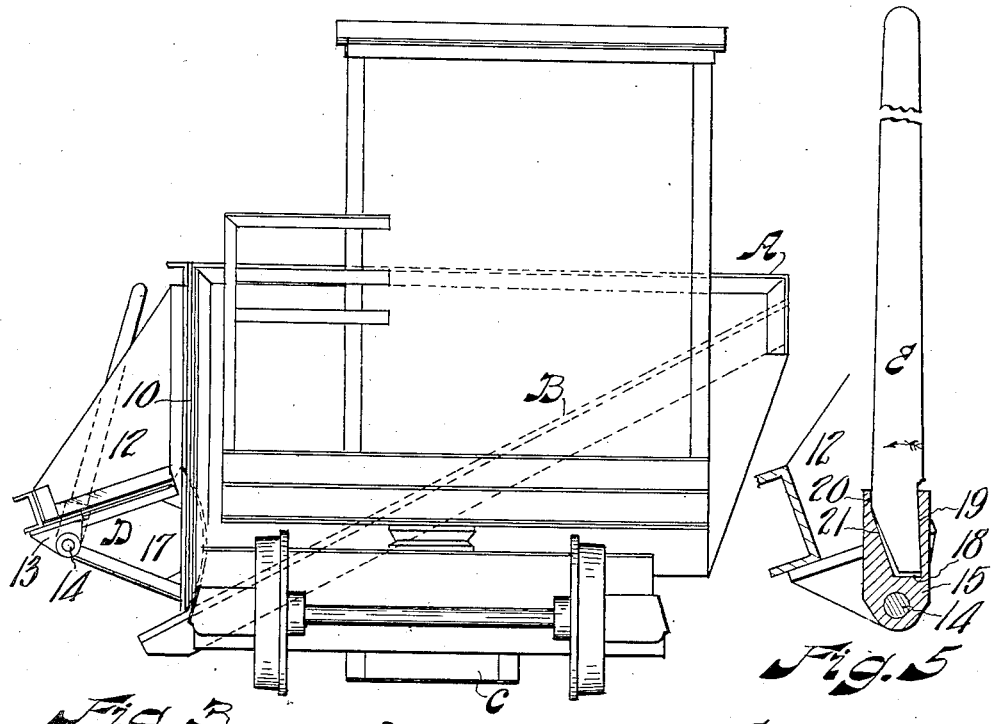
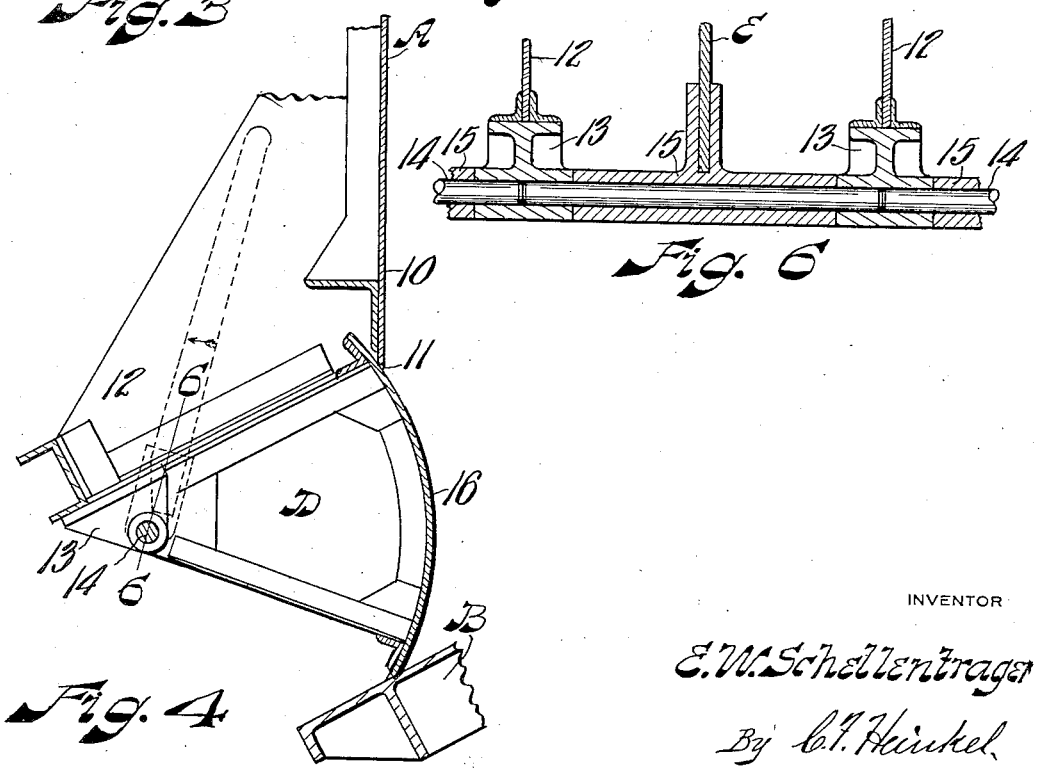

Patented June 30, 1936

2,046,040

UNITED STATES PATENT OFFICE 2,046,040

ASSOCIATED GATES FOR HOPPERS

Eugene W. Schellentrager, Shaker Heights, Ohio

Application August 10, 1931, Serial No. 556,155

15 Claims. (Cl. 105—254)

My invention relates to improvements in structure and operation of associated gates for hoppers.

Objects of my invention are:

To provide a means to prevent or at least mitigate accidental, unintended, unauthorized, or undesirable opening of gates on a hopper;

To locate gate operating means conveniently for operators;

To provide means whereby an operator cannot open more than one gate in one operation;

To provide means whereby the operation of one gate does not affect any other one;

To locate gates and operating means therefor close to the ground in case of quenching cars and the like so that an operator can operate the gates while he is standing on or close to the ground.

Other objects will appear or become apparent or obvious upon inspection of the specification and the accompanying drawings.

In many instances, hoppers are provided with a plurality of discharge openings either connected with individual compartments in the hopper or with the entire interior of the hopper.

Such hoppers are usually rather long but must discharge into shorter receptacles so that it is quite essential that a series of discharge openings and gates be provided on the hopper each of which can be operated individually according to requirements of receptacles and neither one of the gates should affect any other one so that another gate cannot open due to opening of another one and thereby cause trouble or discharge when no receptacle is there to receive the discharge.

There would be trouble for an operator if he did happen to stand in front of one gate while opening another and that one gate did accidentally open and this trouble is aggravated in quenching cars for instance which are usually discharged while coke and the like is still hot and emits dangerous gases.

To avoid the possibility that a person other than the operator may open any one of the gates, I provide only one operating bar and arrange or form the same to suit a part of each gate and to form that part in such a manner that ordinary or usual bars or tools do not fit sufficiently for use to operate the gates.

My invention aims to eliminate such dangers as indicated and at the same time provide easily operable, positively opening and closing and individually controlled gates each of which is operated by one common operating bar so that no gate can be opened while the bar is connected to another one of the gates and no gate can be operated conveniently without this bar.

I attain my objects and aims with mechanism illustratively shown in the accompanying drawings in which:

Fig. 1 is a side view of a coke quenching car having one hopper with the discharge side thereof close to the ground and a plurality of gates for the hopper embodying the principles of my invention.

Fig. 2 is a plan view of the car shown in Fig. 1.

Fig. 3 is an end view of the car shown in Fig. 1 on a larger scale.

Fig. 4 is a transverse section of the gate and hopper relations on a larger scale; the section being taken on the line 4—4 in Fig. 2.

Fig. 5 is a transverse section showing the pocket formation more specifically; the section being taken on the line 5 in Fig. 2.

Fig. 6 is a longitudinal section of the hinges of the gates; the section being taken on the line 6—6 in Fig. 4.

Similar reference characters refer to similar parts throughout the views.

The car shown in the drawings has a wheeled chassis including the hopper A having the sloping bottom B and the center beam C bent down under the hopper to locate the same and the lower or discharge side of the bottom thereof as close to the ground as possible.

The wall 10 of the hopper has, in this instance, six equally sized and equally spaced discharge openings 11 through the same.

The duplicate structures 12 are built sidewise outwardly from the hopper and onto the wall 10 on material thereof adjacent to the discharge openings. The duplicate journal blocks 13 are mounted on the outer end of the structures 12 in a position to locate the axes of the journal bearings therein horizontally across the discharge openings; the axes of the journal bearings being aligned in this instance to permit the use of duplicate gates.

The duplicate shafts 14 are journaled in the blocks 13. One end of each shaft extends about half way into a block on one side of one of the openings and the other end thereof extends half way into a block on the other side of the same opening so that there is a shaft longitudinally across each one of the openings, all shafts aligned, but neither one of the shafts interferes rotatively with any other shaft.

Each of the duplicate gates D has the pivot hub or part 15 journaled on the corresponding one of the shafts and also has the arcuate closure plate 16 concentric with the axis of the shaft and of a width and length to close the corresponding opening and also has the structure 17 connecting the part 15 and the plate 16.

The structure 17 is of such length that the plate 16 is in close proximity to the upper wall of the opening. The bottom edge of the closure plate rests on the top of the sloping floor or bottom B when the gate is closing the opening.

Each of the parts 15 has the pocket 18 formed therein and is preferably located substantially midway of the ends thereof.

Each of the pockets is rectangular cross-sectionally and preferably has the wall 19 inclined to an axis perpendicular to the axis of the shaft, the wall 20 parallel with the perpendicular axis to form a heel, and the wall 21 inclined to the wall 19 as clearly shown in Fig. 5.

The gate operating bar E has one end thereof formed to fit the walls 19 and 20 but need not fit closely to the wall 21.

The object of this pocket and bar relation is to prevent ordinary or usual bars or tools from engaging the walls of the pocket with sufficient security to open the gates so that the gate operating bar must be used for that purpose. Normally, the gate closes automatically due to gravity in the eccentricity thereof but the formation of the pocket and the end of the bar as shown also permits a sticking gate to be loosened by the bar.

The gate operating bar, after insertion thereof into a pocket, is manually moved in the direction of the arrow thereon to open a gate. The inclination of the wall 19 tends to hold the bar E in the pocket; the wall 20 forms an abutment for the bar and assists to retain the same in the pocket so that the part 15 can thereby be moved rotatively to open the gate.

An ordinary bar of sufficient width to withstand the stress of opening the gate could not be inserted sufficiently deep into the pocket to take hold for opening the gate.

The individual shafts are journaled in the respective blocks and the gates are journaled on the respective shafts. The shafts and the gates can rotate individually so that sticking of one or more journals does not cause sticking of a gate, nor does operation of one gate affect another one.

It is obvious that my invention can be used on hoppers other than the one type shown and described. For instance, on hoppers having a series of associated gates of unequal width by making each gate of suitable width instead of equal width as shown; or providing gates of my invention of equal or different area on associated hoppers.

I am aware that my invention can be applied to gate structures other than the one shown and described and that modifications and changes can be made in the structure and arrangements of the parts shown and described within the spirit and intent of my invention and of the appended claims; therefore, without limiting myself to the precise application of my invention as shown and described nor to the precise structure and arrangement of the parts as shown and described.

I claim:

1. In combination, a car, a hopper carried on said car, a sloping, one plane bottom on said hopper, a plurality of discharge openings in one side of said hopper and extending upwardly from said bottom, a movable gate for each of said openings each gate individually pivoted on said hopper, a plate on the end of each of said gates to cover said openings, said plates being of arcuate formation and concentric with the axes of the pivots thereof, the axes of said pivots being located outwardly of and parallel with said one side, the lower edge of each of said plates resting on said bottom when said gates are closing said openings, each of said gates having a specially formed pocket therein, all of said pockets being of the same formation, and a single gate moving bar having an end thereof formed to fit each of said pockets and being easily and conveniently insertable thereinto and removable therefrom and mechanically retaining itself therein during moving of the corresponding gate.

2. In a hopper, a plurality of discharge openings in one side of said hopper, an individually pivotally movable gate for each one of said openings, and the axes of the pivots for said gates being in alinement and traversing said openings and being parallel with said one side, and a single, individual gate operating bar having means thereon to successively engage each one of said gates to pivotally move the same and being easily attachable to and easily removable from said gates and mechanically retaining itself attached to that gate which it is operating by its operation on that gate.

3. A plurality of individual, associated, individually movable gates, each of said gates having a similar pocket therein, the outer end of each pocket being open, the outer end of one side wall of each pocket being closer to the axis of the pocket than the inner end thereof, the outer end of the opposite wall of each pocket being further from said axis than the inner end thereof, and an operating bar for moving the gates having an end thereof formed to easily removably and easily insertably and exchangeably fit into each of said pockets; said form of pockets and end of said bar preventing operation of said gates by means not specially adapted therefor and also serving to mechanically retain said bar in said pocket by the force existing during the moving of a gate.

4. A pivotally movable gate having a pocket therein, one side wall of the pocket being undercut relative to the longitudinal axis of the pocket to form a retaining means for a bar in the pocket, the opposite side wall forming an abutment wall for the operating bar for the gate, and a bar for moving the gate having an end thereof formed to easily insertably and easily removably fit into the pocket; said form of pocket and bar preventing moving of said gate by means not specially adapted therefor and also serving to mechanically retain said bar in said pocket by the force existing during movement of said gate.

5. A plurality of associated, individually movable gates each having a similar, cross-sectionally rectangular pocket therein specially formed to easily receive and easily retain and easily release the end of an operating bar, and an operating bar for moving said gates having an end thereof formed to exchangeably and insertably and easily removably fit into either one of said pockets; said form of pockets and bar preventing moving of a gate by means not specially adapted therefor and also serving to mechanically retain said bar in said pocket by the force existing during opening of the gate.

6. A pivotally movable gate having a cross-sectionally rectangular, open ended, operating bar receiving pocket therein, opposite walls of said pocket being tapered relative to the axis of the pocket, the taper of said opposite walls being different as to degree and direction of inclination, and an operating bar for moving said gate having a cross-sectional rectangular end, the edges thereof formed to fit said opposite walls when inserted into said pocket; said form of pocket and bar preventing moving of the gate by means not specially adapted therefor and also serving to mechanically retain said bar in said pocket by the force existing during opening of said gate.

7. In a hopper, a movable gate having a pocket therein formed with opposite relatively inclined walls, both of said walls being inclined relative to the axis of said pocket and the inclination of each being of a different degree of inclination to form an undercut in one of said walls, and an operating bar having an end thereof formed to enter said pocket to move said gate, said undercut, by that moving, tending to mechanically retain said operating bar in said pocket, the special shape of bar and pocket permitting of easy and convenient removal of said bar from said pocket when no gate operating force is applied by merely an approximately axial movement of said bar.

8. In a hopper having openings adjacent each other in a side thereof, an individually movable gate for each of said openings having a specially formed pocket therein, and one operating bar for all of said gates having an end thereof specially formed to fit each of said pockets and which, when inserted therein, tends to mechanically retain itself therein while the corresponding gate is being moved and which, when no gate operating force is being applied, may be released therefrom by nothing more than an approximately axial movement thereof.

9. In a hopper having openings adjacent each other in a side thereof, a bracket at each side of each of said openings, separate shafts each having the ends thereof journaled in the corresponding two of said brackets and traversing the corresponding of said openings, a gate journaled on each of said shafts and having a pocket therein of special formation, and one operating bar having an end thereof formed to fit each of said pockets and which, when inserted therein and gate moving pressure is brought onto the bar, tends to mechanically retain itself in the pocket and to be released therefrom by only an approximately axial movement of the bar.

10. In a hopper having a plurality of discharge openings, an individually rotatable shaft spaced from and traversing each of said openings, all of said shafts being in alinement, a gate journaled on each of said shafts and each gate having a specially formed pocket therein, each pocket being a duplicate of each other pocket, and a gate operating bar having an end thereof formed to easily and conveniently enter and leave any one of said pockets by nothing more than an approximately axial movement thereof and to mechanically retain itself in any one of said pockets when a gate operating pressure is brought onto said bar.

11. The combination of a hopper having a plurality of pivotally movable gates in a side thereof, discharging near the bottom thereof when the gates are open and resting on the bottom thereof when closed, with a moving means for said gates comprising a specially formed pocket in each of said gates, all of said pockets formed identically, and one gate operating bar having one end thereof formed to fit each one of said pockets; the formation of said pockets and of said end of the bar tending to mechanically retain said bar in the pocket into which it is inserted while the bar is opening the corresponding one of said gates.

12. The combination of a closed bottom hopper having a plurality of laterally spaced discharge openings in a side thereof, extending upwardly from the bottom and permitting discharge of the hopper near the bottom, with a discharge controlling means comprising an individual, individually rotatable shaft for each of said openings and traversing the same, a gate rotatable on each of said shafts to open and close the respective gates, each of said gates resting on the bottom of said hopper when closed, each of said gates having a pocket formed therein, all of said pockets being of identical form, and one gate operating bar having an end thereof formed to fit each one of said pockets, the formation of said pockets and of said end of the operating bar tending to mechanically retain said bar in the pocket into which it is inserted by the force for opening that particular gate.

13. In a means for preventing unauthorized moving of a gate, the combination of a movable gate having a specially formed pocket therein with a moving bar for said gate having an end thereof formed to fit said pocket and being easily and conveniently insertable into and removable from said pocket and mechanically retaining itself in said pocket during the moving of said gate by said bar.

14. A plurality of movable gates, each having a specially formed pocket therein, all of said pockets being duplicates, a single gate moving bar to successively move each of said gates having an end thereof formed to fit each of said pockets and to retain itself mechanically in any one of the pockets during moving of any gate into which said bar is inserted, said bar being easily and conveniently insertable and removable from any one of said pockets, and the special formation of said pockets and said bar tending to prevent unauthorized moving of said gates.

15. A hopper having a plurality of discharge openings in one side thereof, a movable gate for each of said openings hinged on said one side, each of said gates resting on the bottom of said hopper when the gates are closed, each of said gates having a specially formed pocket therein, and a bar for moving said gates having an end thereof specially formed for said pockets, said special form of pockets and bar preventing operation of said gates by means not specially adapted therefor and also serving to mechanically retain said bar in said pocket by the force existing during moving of said gates.

EUGENE W. SCHELLENTRAGER.